(12) United States Patent
Sugiyama

(10) Patent No.: US 10,302,143 B2
(45) Date of Patent: May 28, 2019

(54) TRIPOD TYPE CONSTANT VELOCITY UNIVERSAL JOINT

(71) Applicant: NTN CORPORATION, Osaka (JP)

(72) Inventor: Tatsuro Sugiyama, Shizuoka (JP)

(73) Assignee: NTN CORPORATION, Osaka (JP)

( * ) Notice: Subject to any disclaimer, the term of this patent is extended or adjusted under 35 U.S.C. 154(b) by 125 days.

(21) Appl. No.: 15/319,241

(22) PCT Filed: Jul. 6, 2015

(86) PCT No.: PCT/JP2015/069388
§ 371 (c)(1),
(2) Date: Dec. 15, 2016

(87) PCT Pub. No.: WO2016/006563
PCT Pub. Date: Jan. 14, 2016

(65) Prior Publication Data
US 2017/0152895 A1   Jun. 1, 2017

(30) Foreign Application Priority Data
Jul. 8, 2014 (JP) .................................. 2014-140504

(51) Int. Cl.
*F16D 3/205* (2006.01)
*F16C 23/08* (2006.01)
(Continued)

(52) U.S. Cl.
CPC .......... *F16D 3/2055* (2013.01); *F16C 23/082* (2013.01); *F16D 1/06* (2013.01);
(Continued)

(58) Field of Classification Search
CPC .. F16D 1/06; F16D 3/2055; F16D 2003/2026; F16C 23/082; F16C 2361/41; Y10S 464/905
(Continued)

(56) References Cited

U.S. PATENT DOCUMENTS 6,632,143 B2 * 10/2003 Sugiyama ............. F16D 3/2055
464/111
7,922,590 B2 * 4/2011 Pallante ................ F16D 3/2055
464/905
(Continued)

FOREIGN PATENT DOCUMENTS

JP   2001-330049   11/2001
JP   2005-36982    2/2005
(Continued)

OTHER PUBLICATIONS

GKN Catalog, GKN Automotive, Inc., Auburn Hills MI, 464/905 (Year: 1993).*

(Continued)

*Primary Examiner* — Greg Binda
(74) *Attorney, Agent, or Firm* — Wenderoth, Lind & Ponack, L.L.P.

(57) ABSTRACT

In a tripod type constant velocity universal joint 1, when D1 represents a large inner diameter being a diameter of a circle connecting radially outer end portions of roller guide surfaces 7 and D2 represents a small inner diameter being a diameter of a circle connecting radially inner end portions of the roller guide surfaces 7, a ratio D2/D1 between the small inner diameter D2 and the large inner diameter D1 is set within a range of from 0.73 to 0.80. Further, when d represents a large diameter of a spline formed in a trunnion hub 8 of a tripod member 3 and PCD represents a pitch circle diameter of the roller guide surfaces 7, a ratio d/PCD between the large diameter d and the pitch circle diameter PCD is set to 0.60 or more.

8 Claims, 4 Drawing Sheets

(51) Int. Cl.
    *F16D 1/06*     (2006.01)
    *F16D 3/202*    (2006.01)
(52) U.S. Cl.
    CPC .. *F16C 2361/41* (2013.01); *F16D 2003/2026* (2013.01); *Y10S 464/905* (2013.01)
(58) Field of Classification Search
    USPC .......................................................... 464/111
    See application file for complete search history.

(56) References Cited

U.S. PATENT DOCUMENTS

| | | | |
|---|---|---|---|
| 8,568,244 B2 * | 10/2013 | Kim | F16D 3/2055 464/111 |
| 2002/0032063 A1 | 3/2002 | Watanabe et al. | |
| 2005/0026705 A1 | 2/2005 | Watanabe et al. | |
| 2005/0192104 A1 | 9/2005 | Margerie et al. | |
| 2006/0199651 A1 | 9/2006 | Watanabe et al. | |
| 2006/0223642 A1 | 10/2006 | Izumino et al. | |
| 2010/0123289 A1 * | 5/2010 | Crosby | F16D 3/2055 |

FOREIGN PATENT DOCUMENTS

| | | |
|---|---|---|
| JP | 2006-283828 | 10/2006 |
| JP | 3947342 | 7/2007 |

OTHER PUBLICATIONS

International Search Report dated Oct. 6, 2015 in corresponding International Application No. PCT/JP2015/069388.
International Preliminary Report on Patentability and Written Opinion of the International Searching Authority dated Jan. 10, 2017 in International (PCT) Application No. PCT/JP2015/069388.

\* cited by examiner

TRIPOD TYPE CONSTANT VELOCITY UNIVERSAL JOINT

TECHNICAL FIELD

The present invention relates to a plunging tripod type constant velocity universal joint to be used for power transmission in automobiles, industrial machines, and the like.

BACKGROUND ART

Referring to FIG. 5A and FIG. 5B, a tripod type constant velocity universal joint 51 includes an outer joint member 52 having three track grooves 53 formed at trisected positions in a circumferential direction to extend in an axial direction, and roller guide surfaces 54 formed on opposing side walls of each track groove 53, a tripod member 60 including trunnion journals 62 radially projecting from trisected positions on a trunnion hub 61 in the circumferential direction, and spherical rollers 70 each fitted in a freely rotatable manner about each trunnion journal 62 through intermediation of a plurality of needle rollers 72. The spherical rollers 70 are received in the track grooves 53 of the outer joint member 52, and an outer spherical surface of each spherical roller 70 is guided by the roller guide surfaces 54 formed on both the side walls of each track groove 53 (Patent Document 1).

PRIOR ART DOCUMENTS

Patent Documents

Patent Document 1: JP 3947342 B

SUMMARY OF INVENTION

Problems to be Solved by the Invention

In the tripod type constant velocity universal joint 51 disclosed in Japanese Patent No. 3947342, in consideration of the strength and durability, the outer diameter of the outer joint member is reduced to achieve weight reduction and compactification. To achieve the weight reduction and compactification in the tripod type constant velocity universal joint 51, focusing on the fact that an extra margin is secured for durability in view of the balance between strength and durability, dimensional ratios are reviewed for the purpose of keeping the balance between strength and durability. In recent years, however, there has been increasing a demand for higher fuel efficiency of automobiles, thereby arousing a strong desire for further weight reduction of the constant velocity universal joint as one of the components of automobiles. The tripod type constant velocity universal joint that has been proposed thus far cannot meet the above-mentioned demand.

The present invention has been made in view of the above-mentioned problem, and it is therefore an object thereof to provide a lightweight and compact tripod type constant velocity universal joint having dimensional settings qualitatively different from those of the related art while maintaining the strength and life.

Solutions to the Problems

The tripod type constant velocity universal joint has basic dimensional ratios as indicated by the following seven items.

(1) Shaft diameter d/roller guide surface pitch circle diameter PCD (d/PCD)
(2) Trunnion hub diameter dr/trunnion outer diameter SDj (dr/SDj)
(3) Small inner diameter D2/large inner diameter D1 of outer joint member (D2/D1)
(4) Roller width Ls/roller outer diameter Ds (Ls/Ds)
(5) Trunnion journal diameter Dj/roller outer diameter Ds (Dj/Ds)
(6) Trunnion journal diameter Dj/shaft diameter d (Dj/d)
(7) Needle roller length Ln/trunnion journal diameter Dj (Ln/Dj)

In general, the tripod type constant velocity universal joint is mainly designed in view of the strength (torsional strength). The strength is generally determined uniquely based on a minimum outer diameter of the shaft, and the strength of the tripod member or the strength of the spherical roller is taken into consideration in the second place. Thus, the strength of the tripod member or the strength of the spherical roller is set to the shaft strength or more.

The strength of the tripod member is determined in association with the strength of a root portion of the trunnion journal in a torque applying direction. The root portion of the trunnion journal in the torque applying direction herein refers to a root portion of the trunnion journal that is positioned in a plane including axes of three trunnion journals. A minimum thickness of the trunnion hub at the root portion of the trunnion journal in the torque applying direction as indicated by "t" of FIG. 2 is increased through increase in the diameter of the trunnion journal. Thus, the strength of the root portion of the trunnion journal is increased.

To reduce the outer diameter of an outer joint member, limitation on an operating region of the tripod type constant velocity universal joint needs to be taken into consideration.

In addition, the rolling fatigue life (durability) at a rolling portion, in particular, between the needle roller and the trunnion journal needs to be taken into consideration as well.

The strength of the tripod type constant velocity universal joint is basically set to the shaft strength or more, but the strength of the tripod member and the strength of the spherical roller need to be secured in the second place. Under the above-mentioned circumstances, the inventor of the present invention have focused on dimensional settings on the premise that the strength of the tripod member and the strength of the spherical roller may be secured.

As a basic measure, assuming that the shaft diameter d determined for each joint size has a constant value, the pitch circle diameter PCD of the roller guide surfaces is reduced in accordance with a dimensional setting qualitatively different from that of the related art while securing the minimum thickness of the trunnion hub at the root portion of the trunnion journal in the torque applying direction. The pitch circle diameter PCD of the roller guide surfaces herein refers to a diameter of a circle connecting centers between the roller guide surfaces as indicated by "O1" of FIG. 2. The shaft diameter d refers to a large diameter of a spline formed in the trunnion hub 8 of the tripod member 3.

To achieve the above-mentioned basic measure, it is necessary to secure the minimum thickness of the trunnion hub at the root portion of the trunnion journal in the torque applying direction as indicated by "t" of FIG. 2 even though the pitch circle diameter PCD of the roller guide surfaces is reduced as described above. Therefore, the inventors of the present invention have arrived at such an ultimate dimensional setting that the trunnion journal diameter Dj is increased. The outer diameter Ds of the spherical roller is increased along with the increase in the trunnion journal diameter Dj.

In addition, when the outer diameter Ds of the spherical roller is increased, the outer diameter of the outer joint member is also increased. Therefore, the inventors of the present invention have arrived at such an idea that the width Ls of the spherical roller is reduced so that the outer diameter of the outer joint member is reduced.

When the width Ls of the spherical roller is reduced, the outer diameter of the outer joint member is also reduced. As a result, the value of "small inner diameter D2/large inner diameter D1" (D2/D1) is increased so that the unevenness between the small inner diameter D2 and the large inner diameter D1 is reduced. Through the reduction in the unevenness between the small inner diameter D2 and the large inner diameter D1, there is attained an advantage in the weight reduction and forgeability.

From the viewpoint of the life (durability), the trunnion journal diameter Dj is increased so that the number of needle rollers to be mounted is increased to reduce a contact pressure. With this structure, the roller length can be reduced while securing the life equivalent to that of the related art.

From the ideas as described above, the dimensional settings qualitatively different from those of the related art are achieved on the above-mentioned items (1), (3), (4), (6), and (7).

As a technical measure to achieve the above-mentioned object, according to one embodiment of the present invention, there is provided a tripod type constant velocity universal joint, comprising: an outer joint member having track grooves formed at trisected positions on the outer joint member in a circumferential direction of the tripod type constant velocity universal joint to extend in an axial direction thereof; a tripod member comprising: a trunnion hub to be spline-fitted on a shaft to allow torque transmission therebetween; and trunnion journals radially projecting from trisected positions on the trunnion hub in the circumferential direction; and spherical rollers each fitted in a rotatable manner about each of the trunnion journals through intermediation of a plurality of needle rollers, the spherical rollers being received in the track grooves, and each having an outer spherical surface guided by roller guide surfaces formed on both side walls of each of the track grooves, wherein, when D1 represents a large inner diameter being a diameter of a circle connecting radially outer end portions of the roller guide surfaces and D2 represents a small inner diameter being a diameter of a circle connecting radially inner end portions of the roller guide surfaces, a ratio D2/D1 between the small inner diameter D2 and the large inner diameter D1 is set within a range of from 0.73 to 0.80, and wherein, when d represents a large diameter of a spline formed in the trunnion hub of the tripod member and PCD represents a pitch circle diameter of the roller guide surfaces, a ratio d/PCD between the large diameter d and the pitch circle diameter PCD is set to 0.60 or more.

With the above-mentioned structure, it is possible to attain the lightweight and compact tripod type constant velocity universal joint having the dimensional ratios qualitatively different from those of the related art while maintaining the strength and life. Specifically, as compared to the related-art tripod type constant velocity universal joint having the same shaft diameter and being compactified in the outer diameter, the tripod type constant velocity universal joint according to the one embodiment of the present invention can be compactified approximately into the next smaller size (by about 4%).

As an advantageous structure, it is desired that the ratio d/PCD between the large diameter d and the pitch circle diameter PCD be set within a range of from 0.62 to 0.70. Thus, further weight reduction and compactification can be achieved.

When Ls represents a width of each of the spherical rollers and Ds represents an outer diameter of the each of the spherical rollers, a ratio Ls/Ds between the width Ls and the outer diameter Ds is set within a range of from 0.20 to 0.27. Thus, the outer diameter of the outer joint member can be reduced.

When Ln represents a length of each of the plurality of needle rollers and Dj represents an outer diameter of the each of the trunnion journals, a ratio Ln/Dj between the length Ln and the outer diameter Dj is set within a range of from 0.40 to 0.47. Thus, the strength of the trunnion as well as sufficient durability can be secured.

Effects of the Invention

According to the tripod type constant velocity universal joint of the one embodiment of the present invention, the dimensional settings qualitatively different from those of the related art are achieved while maintaining the strength and life. Thus, ultimate weight reduction and compactification can be achieved.

EMBODIMENTS OF THE INVENTION

An embodiment of the present invention is described with reference to FIG. 1a to FIG. 4.

Figure 1A:
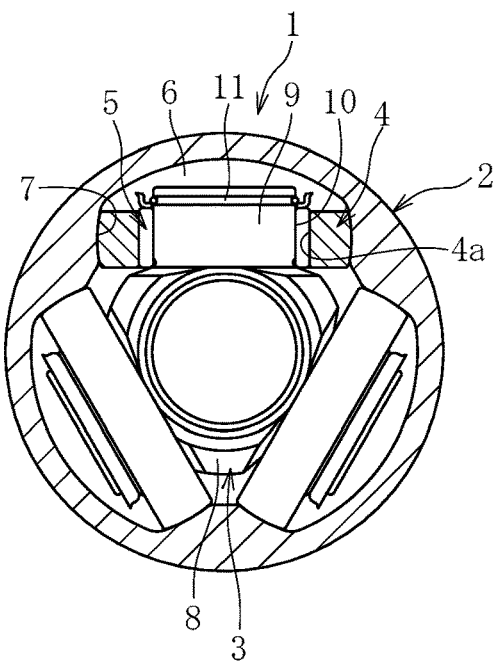
FIG. 1a is a lateral sectional view for illustrating a tripod type constant velocity universal joint according to an embodiment of the present invention.
Figure 1B:
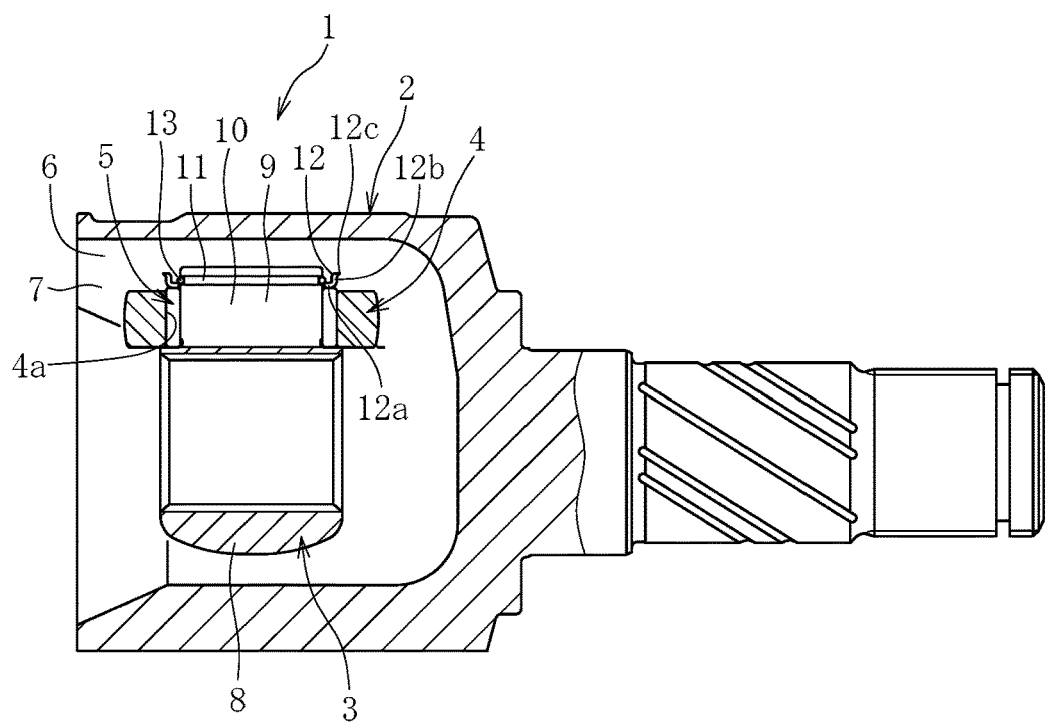
FIG. 1b is a longitudinal sectional view for illustrating the tripod type constant velocity universal joint according to the embodiment of the present invention.

FIG. 1a is a lateral sectional view for illustrating a tripod type constant velocity universal joint according to the embodiment of the present invention. FIG. 1b is a longitudinal sectional view for illustrating the tripod type constant velocity universal joint according to the embodiment of the present invention. As illustrated in FIG. 1a and FIG. 1b, a tripod type constant velocity universal joint 1 according to this embodiment mainly comprises an outer joint member 2, a tripod member 3 serving as an inner joint member, spherical rollers 4, and needle rollers 5 serving as rolling elements. The outer joint member 2 has a hollow cup shape with three track grooves 6 formed on an inner circumference thereof at trisected positions in a circumferential direction to extend in an axial direction. Roller guide surfaces 7 are formed on opposing side walls of each track groove 6. The roller guide surfaces 7 are formed as parts of a cylindrical surface, that is, as partial cylindrical surfaces.

The tripod member 3 comprises a trunnion hub 8 and trunnion journals 9. Three trunnion journals 9 are formed to radially project from trisected positions on the trunnion hub 8 in the circumferential direction. Each trunnion journal 9 has a cylindrical outer circumferential surface 10 and an annular retaining ring groove 11 formed in the vicinity of a shaft end of the trunnion journal 9. The spherical roller 4 is fitted in a freely rotatable manner about the cylindrical outer circumferential surface 10 of the trunnion journal 9 through intermediation of the plurality of needle rollers 5. The cylindrical outer circumferential surface 10 of the trunnion journal 9 serves as an inner raceway surface of the needle rollers 5. An inner circumferential surface 4a of the spherical roller 4 has a cylindrical shape and serves as an outer raceway surface of the needle rollers 5.

In the retaining ring groove 11 formed in the vicinity of the shaft end of the trunnion journal 9, a retaining ring 13 is fitted through intermediation of an outer washer 12. Movement of the needle rollers 5 in an axial direction of the trunnion journal 9 is restricted by a root step portion of the trunnion journal 9 and the outer washer 12. The outer washer 12 comprises a disc portion 12a extending in a radial direction of the trunnion journal 9, and a cylindrical portion 12b extending in the axial direction of the trunnion journal 9. The cylindrical portion 12b of the outer washer 12 has an outer diameter that is smaller than a diameter of the inner circumferential surface 4a of the spherical roller 4, and an end portion 12c of the cylindrical portion 12b, which is located on an outer side when viewed in a radial direction of the tripod member 3, is formed to have a diameter that is larger than that of the inner circumferential surface 4a of the spherical roller 4. Thus, the spherical roller 4 is movable in the axial direction of the trunnion journal 9, and is prevented from dropping off by the end portion 12c.

The spherical roller 4 fitted on the trunnion journal 9 of the tripod member 3 in a freely rotatable manner is guided by the roller guide surfaces 7 of the track groove 6 of the outer joint member 2 in a freely rotatable manner. With this structure, relative axial displacement and relative angular displacement between the outer joint member 2 and the tripod member 3 are absorbed so that the rotation is transmitted at constant velocity.

Figure 3:
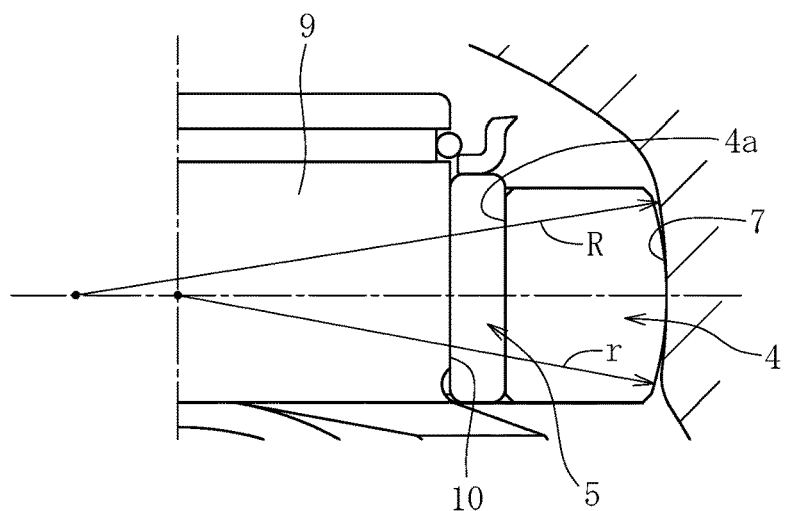
FIG. 3 is an enlarged sectional view for illustrating a contact portion between a spherical roller and a roller guide surface of FIG. 1a and FIG. 1b.

The spherical roller 4 and each roller guide surface 7 are generally brought into contact with each other in two ways, that is, angular contact and circular contact. In the angular contact, the spherical roller 4 and the roller guide surface 7 are brought into contact with each other at two points with a contact angle. In the circular contact, the spherical roller 4 and the roller guide surface 7 are brought into contact with each other at one point as illustrated in FIG. 3. In this embodiment, assuming that R represents a curvature radius of the roller guide surface 7 and r represents a curvature radius of the spherical roller 4, a contact ratio R/r is set within a range of from about 1.02 to about 1.15. In this embodiment, a width Ls of the spherical roller 4 is significantly reduced as compared to that of a related-art tripod type constant velocity universal joint as described later, and hence the circular contact is desired.

Figure 2:
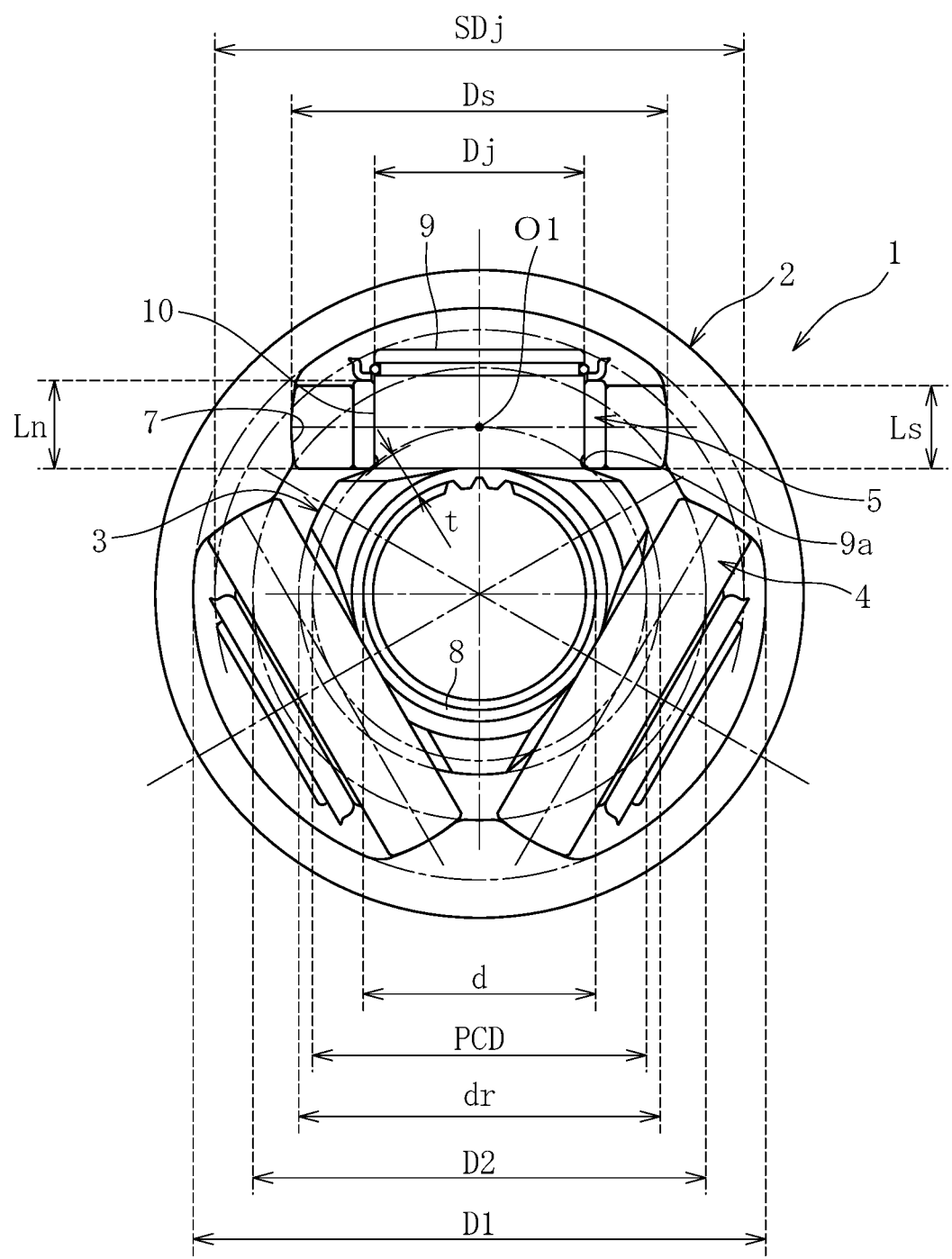
FIG. 2 is a lateral sectional view for illustrating dimensions of respective parts of the tripod type constant velocity universal joint of FIG. 1a and FIG. 1b.

As illustrated in FIG. 2, a radially inner part of the outer joint member 2 comprises large inner-diameter portions each having an inner diameter D1 and small inner-diameter portions each having an inner diameter D2, which are formed alternately in the circumferential direction. The tripod member 3 mounted into the outer joint member 2 has a spline hole formed in the trunnion hub 8 thereof to have a spline large diameter d. The cylindrical outer circumferential surface 10 of the trunnion journal 9 has an outer diameter Dj. The spherical roller 4 has an outer diameter Ds and the width Ls. The needle roller 5 has a length Ln. The roller guide surfaces 7 have a pitch circle diameter PCD.

To achieve ultimate weight reduction and compactification while maintaining the strength and life, the characteristic structure of the tripod type constant velocity universal joint 1 according to this embodiment has dimensional settings qualitatively different from those of the related art.

The strength of the tripod type constant velocity universal joint 1 is basically set to the shaft strength or more, but the strength of the tripod member 3 and the strength of the spherical roller 4 need to be secured in the second place. In view of this, the tripod type constant velocity universal joint 1 according to this embodiment has dimensional settings on the premise that the strength of the tripod member 3 and the strength of the spherical roller 4 may be secured.

As a basic measure, assuming that the shaft diameter d determined for each joint size has a constant value, the pitch circle diameter PCD of the roller guide surfaces 7 is reduced in accordance with a dimensional setting qualitatively different from that of the related art while securing a minimum thickness t of the trunnion hub 8 at a root portion 9a of the trunnion journal 9 in a torque applying direction.

To achieve the above-mentioned basic measure, it is necessary to secure the minimum thickness t of the trunnion hub 8 at the root portion 9a of the trunnion journal 9 in the torque applying direction even though the pitch circle diameter PCD of the roller guide surfaces 7 is reduced as described above. Therefore, the dimensions are set such that the outer diameter Dj of the trunnion journal 9 is increased. The outer diameter Ds of the spherical roller 4 is also increased along with the increase in the outer diameter Dj of the trunnion journal 9.

When the outer diameter Ds of the spherical roller 4 is increased, the outer diameter of the outer joint member 2 is also increased. Therefore, the width Ls of the spherical roller 4 is reduced so that the outer diameter of the outer joint member 2 is reduced.

When the width Ls of the spherical roller 4 is reduced, the outer diameter of the outer joint member 2 is also reduced. As a result, the value of "small inner diameter D2/large inner diameter D1" (D2/D1) is increased so that the unevenness between the small inner diameter D2 and the large inner diameter D1 is reduced. Through the reduction in the unevenness between the small inner diameter D2 and the large inner diameter D1, there is attained an advantage in the weight reduction and forgeability.

From the viewpoint of the life (durability), the outer diameter Dj of the trunnion journal 9 is increased so that the number of needle rollers 5 to be mounted is increased to reduce a contact pressure. With this structure, the roller length Ln is reduced while securing the life equivalent to that of the related art.

On the above-mentioned items (1), (3), (4), (6), and (7), the tripod type constant velocity universal joint according to this embodiment has dimensional settings qualitatively different from those of the related art.

Dimensional ratios of this embodiment are shown in Table 1.

TABLE 1

| | | Ratio (%) | |
|---|---|---|---|
| | Item | Related art | Embodiment |
| (1) | Shaft diameter/roller guide surface PCD (d/PCD) | 50-55 | 62-70 |
| (2) | Trunnion hub diameter/trunnion outer diameter (dr/SDj) | 65-70 | 63-70 |
| (3) | Small inner diameter/large inner diameter of outer joint member (D2/D1) | 66-72 | 73-80 |
| (4) | Roller width/roller outer diameter (Ls/Ds) | 24-27 | 20-27 |
| (5) | Trunnion journal diameter/roller outer diameter (Dj/Ds) | 54-57 | 54-57 |
| (6) | Trunnion journal diameter/shaft diameter (Dj/d) | 83-86 | 87-93 |
| (7) | Needle roller length/trunnion journal diameter (Ln/DP | 47-50 | 40-47 |

In the embodiment shown in Table 1, the dimensions of the respective parts in the structure of FIG. 1a, FIG. 1b, and FIG. 2 are set as follows.

Significant weight reduction and compactification are achieved as long as the ratio d/PCD between the spline large diameter (shaft diameter) d and the PCD of the roller guide surfaces 7 is 60% or more. It is more preferred that the ratio d/PCD fall within a range of from 62% to 70%. The shaft diameter d is determined based on permissible load capacity, and has a constant value for each joint size. Thus, the ratio d/PCD serves as a basis for reducing the outer diameter of the outer joint member. In the concept of the related-art tripod type constant velocity universal joint, however, there is no attention focused on the premise that the strength of the tripod member and the strength of the spherical roller may be secured, or no such idea as described below. Therefore, the ratio d/PCD has not achieved the range of 60% or more, or has not even achieved the range of from 62% to 70%.

The ratio D2/D1 between the small inner diameter D2 and the large inner diameter D1 of the outer joint member 2 is set within a range of from 73% to 80%. The small inner diameter D2 of the outer joint member 2 is set to a value capable of securing an operating region without interference with the shaft diameter d and the trunnion hub diameter dr in consideration of the roller width Ls and the roller outer diameter Ds of the spherical roller 4 described later. On the other hand, the large inner diameter D1 of the outer joint member 2 is determined based on the pitch circle diameter PCD of the roller guide surfaces 7, the trunnion outer diameter SDj, and the roller width Ls and the roller outer diameter Ds of the spherical roller 4. The ratio D2/D1 between the small inner diameter D2 and the large inner diameter D1 is the most significant feature of this embodiment. When the ratio D2/D1 between the small inner diameter D2 and the large inner diameter D1 of the outer joint member 2 is set within the range of from 73% to 80%, the outer diameter of the outer joint member 2 is reduced, and the unevenness between the small inner diameter D2 and the large inner diameter D1 is also reduced. As a result, there is attained an advantage in the weight reduction and forgeability.

The ratio Ls/Ds between the roller width Ls and the roller outer diameter Ds of the spherical roller 4 is set within a range of from 20% to 27%. In this case, the upper limit is set to less than 27%. Thus, the outer diameter Ds of the spherical roller, which is measured in a circumferential direction of a circle having the PCD of the roller guide surfaces 7 as a diameter thereof, can be maximized, and the contact ellipse length and the contact pressure between the spherical roller 4 and the roller guide surface 7 when a predetermined torque is applied can be reduced within permissible ranges. Further, the above-mentioned ratio d/PCD between the shaft diameter d and the PCD of the roller guide surfaces 7 can be increased significantly, and the outer diameter of the outer joint member can be reduced.

The ratio Ln/Dj between the roller length Ln of the needle roller 5 and the outer diameter Dj of the trunnion journal 9 is set within a range of from 40% to 47%. In this case, the upper limit is set to less than 47%. The ratio of the outer diameter Dj of the trunnion journal 9 to the shaft diameter d is increased to a range of from 87% to 93%. Thus, even when the ratio Ln/Dj falls within the range of from 40% to 47%, the rolling fatigue life (durability) can be secured between the needle roller and the trunnion journal. This is because the number of needle rollers 5 to be mounted is increased to reduce the contact pressure as described above so that the roller length Ln can be reduced while securing the life equivalent to that of the related art. Incidentally, the number of needle rollers 5 to be mounted is increased by about 20% in this embodiment.

The ratio dr/SDj between the diameter dr of the trunnion hub 8 and the trunnion outer diameter SDj and the ratio Dj/Ds between the outer diameter Dj of the trunnion journal 9 and the outer diameter Ds of the spherical roller 4 are set to the same dimensional ratios as those of the related art in consideration of the strength and durability.

Figure 4:
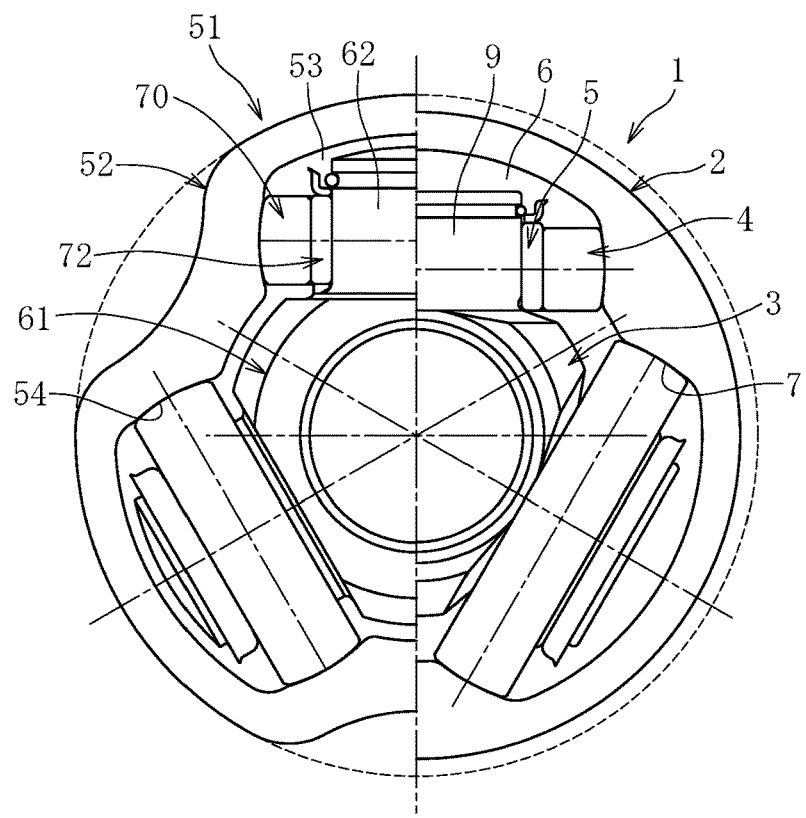
FIG. 4 is a lateral sectional view for illustrating the tripod type constant velocity universal joint of FIG. 1a and FIG. 1b and a related-art tripod type constant velocity universal joint, which are arranged side by side in contrast to each other.
Figure 5A:
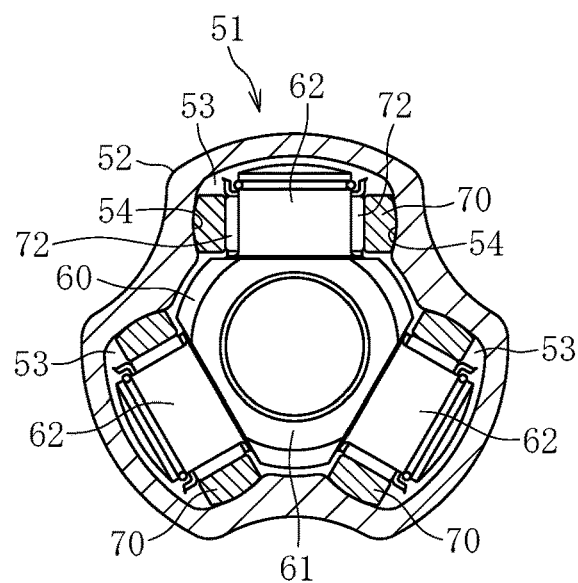
FIG. 5a is a lateral sectional view for illustrating the related-art tripod type constant velocity universal joint.
Figure 5B:
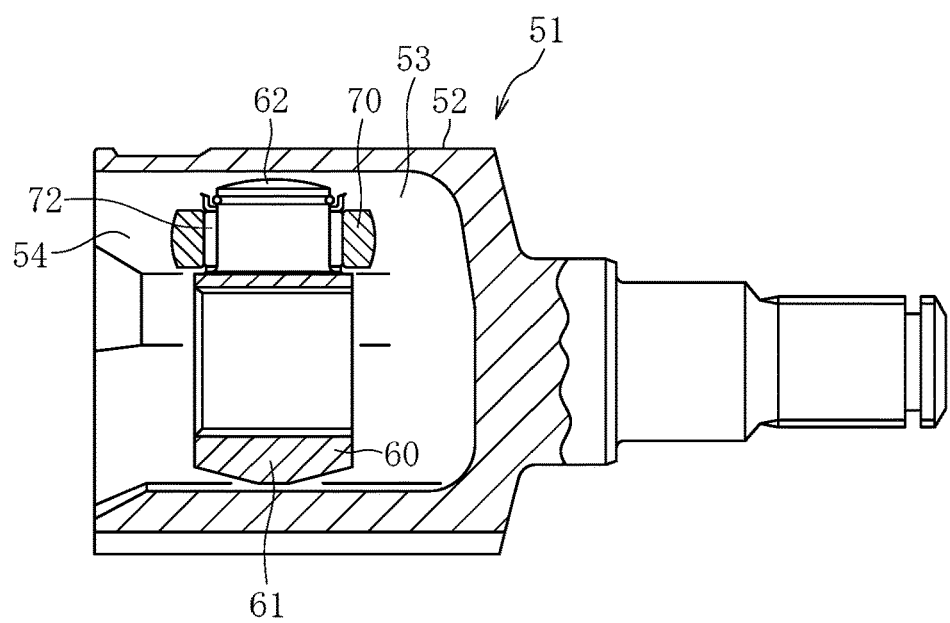
FIG. 5b is a longitudinal sectional view for illustrating the related-art tripod type constant velocity universal joint.

FIG. 4 is a lateral sectional view for illustrating the tripod type constant velocity universal joint according to the embodiment of the present invention and the related-art tripod type constant velocity universal joint, which are arranged side by side in contrast to each other. It may be understood how lightweight and compact the tripod type constant velocity universal joint according to this embodiment as illustrated on the right side of FIG. 4 is as compared to the related-art tripod type constant velocity universal joint.

In the above-mentioned embodiment, the root portion 9a of the trunnion journal 9 of the tripod member 3 is a rib for directly guiding the needle rollers 5, but the present invention is not limited thereto. A shoulder portion may be formed on the root portion and a separate inner washer may be interposed between the shoulder portion and the end portions of the needle rollers.

The present invention is not limited to the above-mentioned embodiment. As a matter of course, the present invention may be carried out in various other embodiments without departing from the gist of the present invention. The scope of the present invention is defined in claims, and encompasses the meanings of equivalents described in claims and all changes within the scope of claims.

DESCRIPTION OF REFERENCE SIGNS 1 tripod type constant velocity universal joint
2 outer joint member
3 tripod member
4 spherical roller
5 needle roller
6 track groove
7 roller guide surface
8 trunnion hub
9 trunnion journal
9a root portion
10 cylindrical outer circumferential surface
D1 large inner diameter
D2 small inner diameter Dj trunnion journal diameter
Ds spherical roller outer diameter
Ln needle roller length
Ls spherical roller width
d shaft diameter (spline large diameter)
PCD pitch circle diameter of the roller guide surfaces

The invention claimed is:

1. A tripod type constant velocity universal joint, comprising:
an outer joint member having track grooves formed at trisected positions on the outer joint member in a circumferential direction of the tripod type constant velocity universal joint to extend in an axial direction thereof;
a tripod member comprising:
a trunnion hub to be spline-fitted on a shaft to allow torque transmission therebetween; and
trunnion journals radially projecting from trisected positions on the trunnion hub in the circumferential direction; and
spherical rollers each fitted in a rotatable manner about each of the trunnion journals through intermediation of a plurality of needle rollers,
the spherical rollers being received in the track grooves, and each having an outer spherical surface guided by roller guide surfaces formed on both side walls of each of the track grooves,
wherein, when D1 represents a large inner diameter being a diameter of a circle connecting radially outer end portions of the roller guide surfaces and D2 represents a small inner diameter being a diameter of a circle connecting radially inner end portions of the roller guide surfaces, a ratio D2/D1 between the small inner diameter D2 and the large inner diameter D1 is set within a range of from 0.73 to 0.80, and
wherein, when d represents a large diameter of a spline formed in the trunnion hub of the tripod member and PCD represents a pitch circle diameter of the roller guide surfaces, a ratio d/PCD between the large diameter d and the pitch circle diameter PCD is set to 0.60 or more.

2. The tripod type constant velocity universal joint according to claim 1, wherein the ratio d/PCD between the large diameter d and the pitch circle diameter PCD is set within a range of from 0.62 to 0.70.

3. The tripod type constant velocity universal joint according to claim 2, wherein, when Ls represents a width of each of the spherical rollers and Ds represents an outer diameter of the each of the spherical rollers, a ratio Ls/Ds between the width Ls and the outer diameter Ds is set within a range of from 0.20 to 0.27.

4. The tripod type constant velocity universal joint according to claim 3, wherein, when Ln represents a length of each of the plurality of needle rollers and Dj represents an outer diameter of the each of the trunnion journals, a ratio Ln/Dj between the length Ln and the outer diameter Dj is set within a range of from 0.40 to 0.47.

5. The tripod type constant velocity universal joint according to claim 2, wherein, when Ln represents a length of each of the plurality of needle rollers and Dj represents an outer diameter of the each of the trunnion journals, a ratio Ln/Dj between the length Ln and the outer diameter Dj is set within a range of from 0.40 to 0.47.

6. The tripod type constant velocity universal joint according to claim 1, wherein, when Ls represents a width of each of the spherical rollers and Ds represents an outer diameter of the each of the spherical rollers, a ratio Ls/Ds between the width Ls and the outer diameter Ds is set within a range of from 0.20 to 0.27.

7. The tripod type constant velocity universal joint according to claim 6, wherein, when Ln represents a length of each of the plurality of needle rollers and Dj represents an outer diameter of the each of the trunnion journals, a ratio Ln/Dj between the length Ln and the outer diameter Dj is set within a range of from 0.40 to 0.47.

8. The tripod type constant velocity universal joint according to claim 1, wherein, when Ln represents a length of each of the plurality of needle rollers and Dj represents an outer diameter of the each of the trunnion journals, a ratio Ln/Dj between the length Ln and the outer diameter Dj is set within a range of from 0.40 to 0.47.

* * * * *